AIR BRAKE
Filed July 21, 1954 3 Sheets-Sheet 1
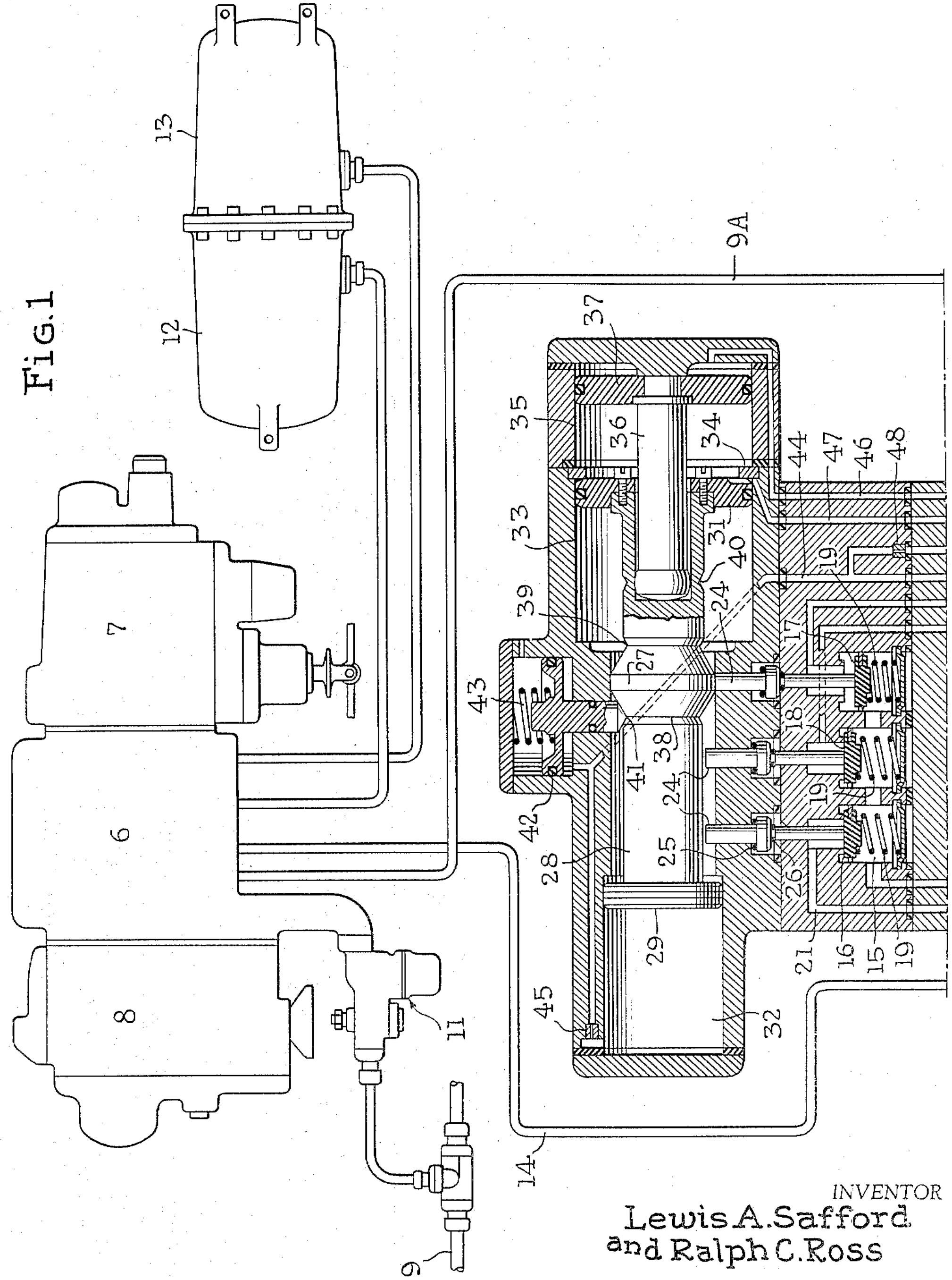
INVENTOR
Lewis A. Safford
and Ralph C. Ross
BY Dodge and Sons
ATTORNEYS AIR BRAKE
Filed July 21, 1954 3 Sheets-Sheet 2
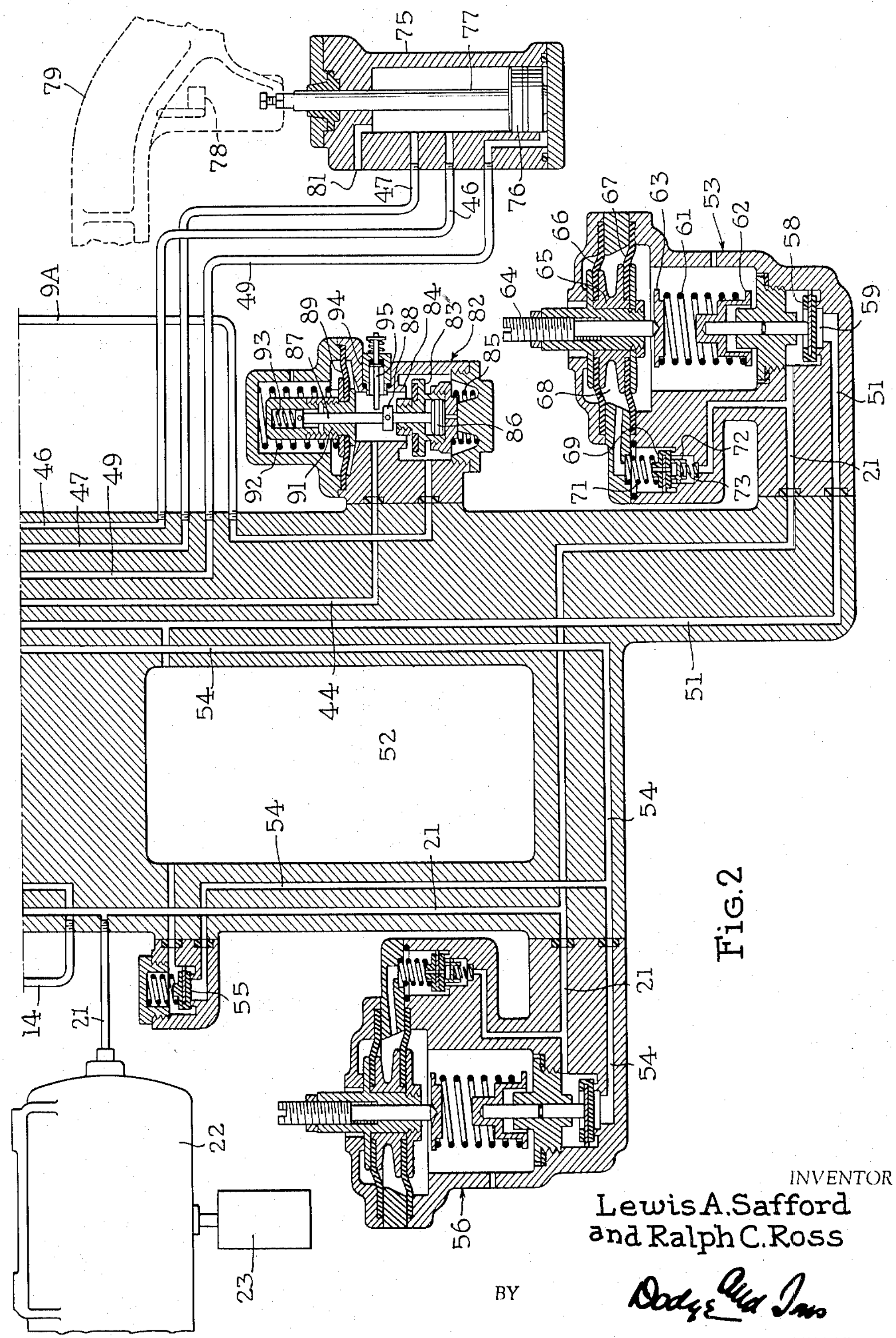
INVENTOR
Lewis A. Safford
and Ralph C. Ross
BY Dodge and Sons
ATTORNEYS Jan. 3, 1956 R. C. ROSS ET AL 2,729,515
AIR BRAKE
Filed July 21, 1954 3 Sheets-Sheet 3
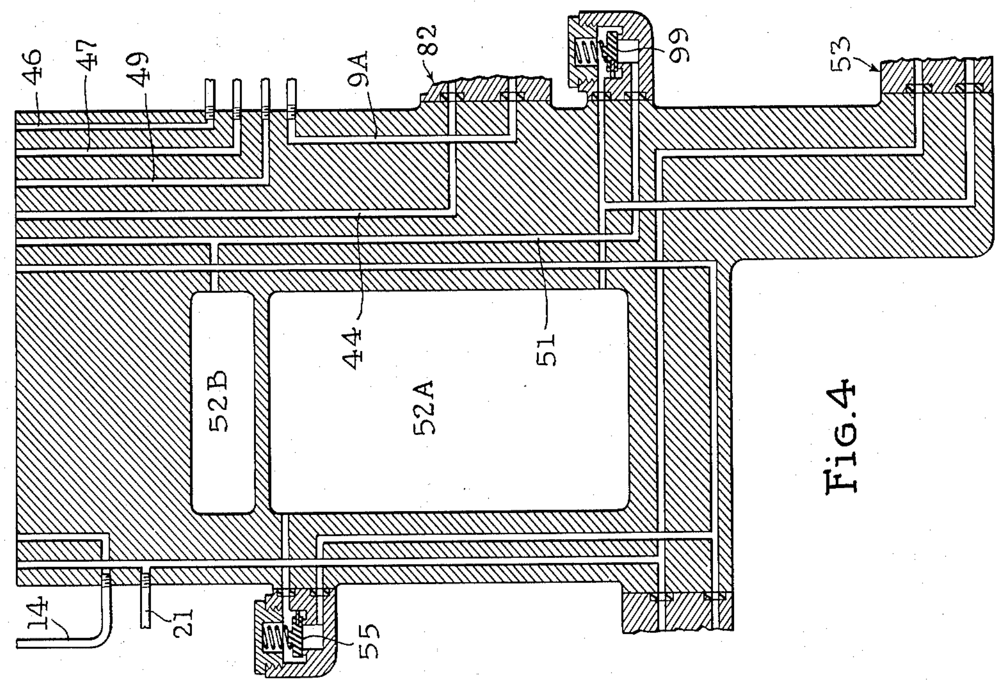
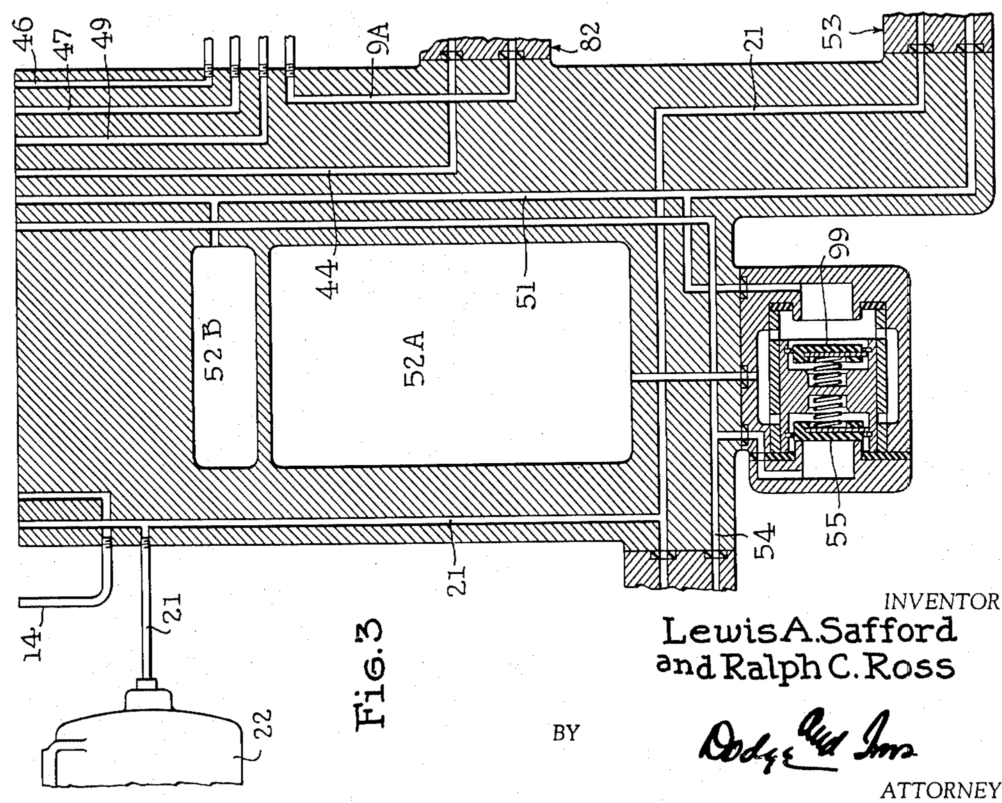
INVENTOR
Lewis A. Safford
and Ralph C. Ross
BY Dodge and Sons
ATTORNEYS United States Patent Office 2,729,515

Patented Jan. 3, 1956

2,729,515

AIR BRAKE

Ralph C. Ross and Lewis A. Safford, Watertown, N. Y., assignors to The New York Air Brake Company, a corporation of New Jersey Application July 21, 1954, Serial No. 444,896

6 Claims. (Cl. 303—22)

This invention relates to multiple position, empty-and-load valves for use with automatic air brakes, particularly freight car brakes.

Two-position empty-and-load brakes have long been in use on types of freight cars that carry bulk loads and are almost invariably empty or fully loaded. They respond to the relative positions assumed under varying load by two parts of a truck suspension, commonly the truck frame, and the spring-mounted truck bolster.

Steadily increasing operating speeds and greater disparity between empty and loaded weights of the type of freight car susceptible to highly variable loading have created a condition requiring adjustment of braking force in relation to load (load compensation) better than can be attained by any two-position empty-and-load brake.

A load compensating brake commercially known as the ABLC has successfully fulfilled the basic need. Like the empty-and-load brake (known as the ABEL) which preceded it, the ABLC sets itself automatically in response to positional relationships created by load and existing when a vented brake pipe was initially recharged. Unlike the empty-and-load brake, it established braking forces graduated quite closely according to load, over a large part of the intermediate load range. This entailed rather complicated adjusting mechanism. The scheme also included a differential brake cylinder which necessarily added to the initial cost and maintenance problems.

To overcome objections based almost wholly on maintenance expense considerations, a three-position load compensating type of brake, better in adjustment than the empty-and-load but relatively simpler than the ABLC has been offered commercially. It establishes braking forces at three basic levels through use of the differential type of brake cylinder.

Applicants' assignee, after testing this brake, was not convinced that it had all the advantages that might be secured at the same or smaller cost, and the present invention is the result of efforts to improve brakes of the multiple-capacity type.

The first step was to replace the standard 10 inch cylinder used with the AB brake by a standard 12 inch plain cylinder whose piston was limited to a short stroke by an ordinary slack adjuster. Five inch stroke has proved satisfactory. The 12 inch plain cylinder costs much less to make and to maintain than does the differential cylinder, and the connection of the slack adjuster (also required by the differential cylinder) is much less of a problem. The saving is substantial.

The selector valve uses principles known to be commercially acceptable, but was given an added function, required by the use of two proportioning valves, one for empty condition and the other for intermediate load conditions. This new function affords an independent exhaust path which by-passes both proportioning valves. The proportioning valves are characterized by an intercepting function, and after closing do not permit reverse flows required for release. Hence a releasing by-pass was needed.

The use of a single proportioning valve is known, but the use of two which are selectively placed in control is believed to be a wholly new concept, whose practicality depends in large degree upon the exhaust by-pass added to the selector valve.

Another novel feature is the use with the proportioning valves of a compensating volume to stabilize the equalization pressures of the automatic brake controlling valve device (presently the AB valve). The use of two individually proportioned compensating volumes one for each proportioning valve is technically possible, but leads to a cumbersome unit. The drawings illustrate three compact and practicable alternatives.

The first, and preferred scheme uses one and the same compensating volume for either of the two proportioning valves. This entails variations of equalization pressures which are small enough to be tolerated. The second and third schemes each require, in addition to a main compensating volume, a complementary volume and check valves which establish selective relationships of this and the main volume. It results that the main volume alone serves one of the proportioning valves and both volumes together serve the other of the proportioning valves. Either of the second and third schemes affords accuracy with negligible increase of space as compared with the first scheme. The cost is only slightly increased.

Another valuable novel feature of the proportioning valves is inclusion of means to delay their action until brake cylinder pressure attains a definite low value, say 9 p. s. i. The effect sought and thus secured is to assure that the brake piston will move immediately to brake applying position even on empty cars, in response to small brake pipe pressure reductions. Prior art proportioning valves lack this feature and as a consequence, when active, are apt to prevent the related brake from applying in response to light reductions of brake pipe pressure.

The brake-pipe cut-off valve here shown in the interest of completeness has been considerably simplified as compared with functionally similar valves heretofore used, and affords notably improved performance. It is not the invention of these applicants and so is not here claimed.

The invention will now be described by reference to the accompanying drawings which show the AB valve and reservoirs on a smaller scale than the related load mechanism, the latter being shown in vertical section and diagrammatically to the extent that the ports are shown as if they lay all in the plane of section.

Fig. 1 shows the AB valve, its reservoir, brake pipe and connections in elevation and the selector valve mechanism with its connections in axial section.

Fig. 2 shows the brake cylinder in fragmentary elevation, a portion of a truck frame in elevation in broken lines, and in vertical section, the weighing valve, cut-off valve, two proportioning valves, the compensating volume, and appropriate pipes and passages.

Figs. 1 and 2 when assembled, one above the other, afford a diagram of the essential brake equipment for one car.

Figs. 3 and 4 show sections each similar to a portion of Fig. 2, and each showing an arrangement in which a main and complementary compensating volume replace the single compensating volume of Fig. 2.

All statements of direction refer to parts as positioned in Figs. 1–2.

Refer first to Figs. 1 and 2.

It is contemplated that the invention will be used with the AB brake and it is illustrated as so used. The AB brake is in current use and typifies any valve involving the triple valve principle.

The pipe bracket 6 carries the service portion 7 and the emergency portion 8. The brake pipe 9 is connected to the bracket 6 through a branch pipe in which is inserted a standard dust collector and cut-out cock 11. The emergency reservoir 12 and auxiliary reservoir 13 are connected by pipes to the bracket 6. Pipe 14 is the brake cylinder connection which in conventional AB installations leads directly to the brake cylinder, but here leads through the empty-and-load mechanism of the present invention. The connection 9A is in free communication with the brake pipe 9.

To simplify description and avoid multiplying reference numerals, a single numeral will be used to designate any continuous passage and any pipe in free communication with such a passage. Since the commercial embodiment will differ somewhat in arrangement from the diagrammatic showing, the sectional construction of the housings (though indicated schematically in the drawings) will not be elaborated in the description. Accepted commercial practices will, of course, be used, and nothing deemed patentable is involved.

The heart of the selector-valve mechanism is the chamber 15 to which brake cylinder connection 14 leads, and from which flow is permitted by three selectively opened poppet valves, i. e. the "Load" valve 16, the "Empty" valve 17 and the "Intermediate" valve 18. Each of these valves is urged toward its seat by pressure in chamber 15 and by respective ones of three coil compression springs 19. The springs 19 are relatively light, and the one which seats valve 16 must be so.

The reason for this is that valve 16 controls direct flow to and from passage 21 which leads to the brake cylinder 22 and during releases must open quite freely so as not to impede exhaust flow from the brake cylinder 22 through passage 21 past valve 16 and through 14 to the AB valve exhaust. Cylinder 22 is equipped with any usual slack adjuster, diagrammatically indicated at 23.

The valves 16, 17 and 18 are identical, and each is forced open by one of three identical tappets 24. These are sealed against leakage both in their valve-open and valve-closed positions by one or the other of the gaskets 25, 26 which encircle each of them and which are identified by these numbers on the tappet for valve 16.

The valves 16, 17, 18 are held open selectively by the annular lobe 27 in rod 28 which rod connects "reset" piston 29 with the larger load-setting piston 31. Piston 29 is called the reset piston, because in the first phase of every load-weighing operation piston 29 is forced all the way to the right until "Empty" position (shown in Fig. 1) is reached. After this the weighing operation proceeds, as will later be described.

Reset piston 29 works in a cylinder 32 closed at its left hand end and load setting piston 31 works in a cylinder 33 of larger diameter than cylinder 32. A stop ring 34 is clamped between the main housing and an extension thereof. The latter encloses a coaxial cylinder 35, which is closed at its right hand end and conveniently is of the same diameter as cylinder 33. Ring 34 limits the leftward motion of piston 37. The space between pistons 29 and 31 is vented to atmosphere.

The right hand end of rod 28 has a counterbore to receive the end of rod 36 attached to the intermediate setting piston 37 which works in cylinder 35. Rod 36 is dimensioned to limit the approach of pistons 31 and 37 to one another. On opposite sides of lobe 27 are annular grooves 38, 39 which are engaged by the nose 41 on the stem of latch-piston 42. A third groove 40 is located on stem 28 further to the right. Piston 42 is biased downward to latch-engaging position by spring 43.

Piston 42 works in a cylinder as shown. The space above the piston is vented to atmosphere and the space below the piston is in free communication with passage 44. The cylinder space 32 to the left of reset piston 29 communicates with passage 44 through a choke 45.

The parts are proportioned as will now be described.

In "Empty" position (shown in Fig. 1) pistons 31 and 37 are to the right as far as they go, and nose 41 engages in groove 38. This position is reached by admitting pressure fluid to cylinder 32 to the left of piston 29. The pressure fluid arrives from the brake pipe via passage 44 and choke 45, so latch piston 42 will first be lifted.

In "Intermediate" position lobe 27 depresses the tappet for valve 18 and latch nose 41 is in groove 39. This position is reached by admitting pressure fluid via passage 46 to the right side of piston 37 which is arrested by stop ring 34 with the parts positioned as stated.

In "Load" position lobe 27 depresses the tappet for valve 16 and latch nose 41 is in groove 40. This position is reached by admitting pressure fluid to both passages 46 and 47 so that both pistons 31 and 37 are urged to the left, and piston 31 moves to the left to its limit of motion.

As will later appear more clearly, passages 46 and 47 are each fed from passage 44 through a choke 48, passage 49 and the weighing cylinder. Hence latch nose 41 is retracted before the shift to either "intermediate" or "Load" position commences.

The valves 16, 17 and 18 control flow from chamber 15 to brake cylinder 21 and they are open strictly selectively as to all flows toward the brake cylinder.

When valve 16 is open the flow is free in both directions.

When valve 17 is open the flow is via passage 51 (which is in free communication with compensating volume 52), and then through the proportioning valve 53 to brake cylinder passage 21. Valve 53 is set to afford a proportionally reduced brake cylinder pressure appropriate to an empty car.

When valve 18 is open the flow is via passage 54 which communicates through check valve 55 with compensating volume 52. Passage 54 communicates with brake cylinder passage 21 through a proportioning valve 56, set to proportion an intermediate brake cylinder pressure.

Respective proportioning valves close when pressures in their discharge sides rise to a characteristic fraction of the pressure on their supply sides. The characteristic fraction is set by adjustment and the two valves are differently adjusted. Though each proportioning valve discharges to passage 21, neither can interfere when valve 16 is open; nor can they interfere with one another because they are set for different fractional reductions. When valve 17 is open check valve 55 isolates passage 54 from compensating volume 52. When valve 18 is open valve 53 would close while 56 was still open and so would not interfere with the control effected when 56 closed.

With a 12 inch plain brake cylinder limited to 5 inch travel, full equalization would be reached at 50 p. s. i. in pipe 14 in all three settings of the selector valve if volume 52 were 365 cu. in. and connected in "Light" position and if it were 300 cu in. and connected in "Intermediate" position. A single volume between 300 and 365 cu. in. (325 cu. in. has been used successfully) gives a close enough approximation to full equalization at 50 p. s. i. for all practical purposes, and is shown in Fig. 2.

The proportioning valves 53 and 56 are functionally similar. Mechanically they differ only in that the differentials between diaphragm areas are so chosen that the valves 53 and 56 afford different proportional pressure reductions. This difference in differential area is not shown in the drawings because it cannot be done effectively in the small scale used. The following description of valve 53 will suffice for both.

The flow-controlling valve is a poppet valve 58 which opens in the direction of flow from passage 51 through valve-seat 59 to brake cylinder passage 21. There is no reverse flow since the brake cylinder 22 is exhausted through valve 16 as above explained. The valve 58 is moved in the closing direction by force developed through a coil compression spring 61 confined between a spring seat 62, which is in thrust relation to valve 58, and a spring-seat 63 which is sustained by adjustable thrust screw 64. The screw 64 is mounted in the hub 65 which connects the centers of two diaphragms 66, 67 of unequal areas whose peripheries are clamped in the housing of the valve structure.

The upper and smaller diaphragm 66 is exposed to atmospheric pressure on its upper face, whereas the lower diaphragm 67 is similarly exposed on its lower face. The space 68 between the diaphragms is exposed to pressure in brake cylinder connection 21, but the connection which so exposes it is preferably not a free one. Instead, a valve 69 loaded by spring 71 is used to produce a pressure drop such that pressure in passage 21 must reach about 9 p. s. i. before proportioning starts. This is to ensure that the brake piston will start to move before proportioning starts. To permit back flow from chamber 68 a reversely set check valve 72, lightly loaded by spring 73, controls a bleed port, which conveniently can lead through valve 69.

The spring 61 affords a thrust connection between hub 65 and valve 58. It is convenient but not strictly necessary that this connection be elastic.

Valve 56 is identical with valve 53 except that the diaphragms corresponding to 66 and 67 afford a different area differential. Valve 56 controls flow from passage 54 to passage 21 and produces a smaller proportional reduction, so that brake cylinder pressures limited by it are higher.

Various different load-weighing mechanisms might be used but one (for which no novelty is here claimed) is illustrated in the interests of completeness.

A vertical cylinder 75 is mounted on the spring-supported truck bolster (not shown) and contains a piston 76 whose rod 77 can collide at its upper end with a lug 78 on the truck frame 79 unless the piston is in its lowermost position. The upper end of the cylinder is vented to atmosphere at 81, and there are two side-ports with which the connections 46 and 47 respectively communicate. On an empty car the piston 76 cannot rise high enough to expose either port, but at half load it can rise far enough to expose the port leading to passage 46 and on a loaded car it can go further and also expose the port leading to passage 47.

Recourse is had to the familiar expedient of activating the piston 76 in about the first 50 p. s. i. of a system charge starting with a vented brake pipe, and then causing the piston to lower fully, and remain lowered until brake pipe pressure is once more reduced substantially to atmospheric pressure.

This cycle is controlled by the cut-off valve which is identified by the numeral 82 applied to its housing (see Fig. 2). This housing is continuously connected with the brake pipe by connection 9A and the valve controls communication between 9A and passage 44 which in turn is connected through choke 48 and passage 49 with the cylinder 75 at a point below piston 76. The cut-off valve proper is a poppet valve 83 which closes against its seat 84 in the direction of flow from 9A to passage 44. The valve 83 is biased in a closing direction by a light spring 85. Enclosed in the valve 83 is a cylinder in which a piston 86 (smaller in diameter than the seated area of the valve 83) may reciprocate. Piston 86 is exposed to the pressures above and below valve 83, at least when the valve is closed, and is connected to a stem 87 which carries a collar or encircling flange 88 fixed to it.

A diaphragm 89 is clamped at its periphery between parts of the housing 82 and is subject to pressure in passage 44 acting upward upon it. The upper face of diaphragm 89 is exposed to atmospheric pressure. At its center diaphragm 89 carries hub 91 biased downward (i.e., in the direction to open valve 83) by spring 92 which is stronger than spring 85. Stem 87 is slidable longitudinally through a guideway in hub 91 and is urged downward by a light spring 93 which reacts between a portion of hub 91 and the upper end of stem 87, which has an enlarged head.

A tiltable spring seated vent valve 94 has a stem 95 which projects into the path of flange 88. Tilting of the vent valve cocks it off its seat and opens it, thus venting connection 44.

Assume the brake pipe 9 has been vented and recharging starts. Brake pipe air will flow through 9A, past valve 83 (which is then held open by spring 92) to passage 44. The chokes 45 and 48 assure that latch piston 42 is first forced back, then piston 29 is forced to the right, setting the selector valve to "Empty" position. At this time or slightly later, piston 76 will start to rise. The distance it can rise until arrested by stop 78 depends on the load on the car, and determines the position assumed by the selector valve. If neither port 46 or 47 is exposed the selector remains in "Empty" position. If 46 only is exposed piston 37 moves the selector to "Intermediate" position. If 47 is also exposed piston 31 moves the selector all the way to "Load" position.

When passage 44 has been charged to about 50 p. s. i. diaphragm 89 will have lifted enough to allow valve 83 to close. This stops the pressure rise in passage 44 but brake pipe pressure continues to rise in 9A. Soon valve 83 is firmly seated by pressure beneath it and piston 86 is subject to an increasing pressure differential, acting upward. Before charging is complete, piston 86 overpowers spring 93, flange 88 engages stem 95 and cocks valve 94 off its seat.

This vents connection 44, causing latch 41 to re-engage and seating valve 83 so firmly by pressure that it cannot again open until brake pipe pressure falls below about 5 p. s. i.

The setting of the selector valve either connects the AB valve directly to the brake cylinder, or interposes one or the other proportioning valve with volume 52 connected to draw air from the auxiliary reservoir and compensate for the reduced flows permitted by the proportioning valves.

In the "load" position lobe 27 depresses the left-most stem 24 so that valve 16 is held open. Valves 17 and 18 remain closed. Hence brake-cylinder pipe 14 affords free communication in both directions between the AB valve and the brake cylinder. The AB valve functions normally.

In the empty position, shown in Figure 1, lobe 27 depresses the right-hand stem 24, so that valve 17 is held open. Valves 16 and 18 are closed by their springs and are urged to their seats when fluid pressure is admitted through pipe 14 to chamber 15. Assume that under the conditions just stated the AB valve admits air to pipe 14. From pipe 14 air flows through chamber 15, past valve 17 and then via passage 51 to compensating volume 52 and also to seat 59 of the "empty" proportioning valve 53. The valve disc 58 will lift and air will flow to the brake cylinder 22 via passage 21.

Development of pressure in passage 21, after a delay imposed by valve 69, will cause development of pressure in chamber 68, and eventually the "empty" proportioning valve 53 will act to limit brake cylinder pressure to a low value (by closing valve disc 58 against seat 59). Observe that check valve 55 prevents flow from compensating volume 52 to proportioning valve 56.

When the AB valve releases, pressure in pipe 14 will fall, and the brake cylinder will exhaust via passage 21, the flow unseating valve 16 and continuing through chamber 15 to pipe 14. Compensating volume 52 will exhaust via passage 51 past open valve 17, through chamber 15 to pipe 14.

In intermediate load position lobe 27 holds valve 18 open. The flow from pipe 14 is through chamber 15, past valve 18 (valves 16 and 17 being closed) and then via passage 54 to "intermediate" proportioning valve 56, and past check valve 55 to compensating volume 52. Volume 52 has an open connection to "empty" proportioning valve 53, but this is of no significance because valve 53 will close in response to rising brake cylinder pressure before valve 56 will close in response to rising brake cylinder pressure. The brake cylinder exhaust flow is via passage

21 past valve 16 and through chamber 15. Volume 52 exhausts through passage 51 past valve 17 and through chamber 15.

As explained, the use of a single compensating volume 52 gives an approximation. Figures 3 and 4 show how accuracy may be had at the price of a little extra space and one added check valve. In these figures all parts essentially identical with parts in Figure 2 are numbered as in Figure 2.

Referring to Figures 3 and 4, which are in essence identical with each other, there is a main compensating volume 52A (say 300 cu. in.) to which passage 54 leads through check valve 55 (as in Fig. 2) and a complementary compensating volume 52B (say 65 cu. in.) to which passage 51 is freely connected. (Compare the free connection of 51 and 52 in Figure 2.)

The added check valve is 99 and permits flow from 51 and 52B to 52A but closes against reverse flow.

In Figure 3 the check valves 55 and 99 are located in a single fitting whereas in Figure 4 they are remote from one another.

Obviously as to each Figure 3 or 4, both 52A and 52B receive air when proportioning valve 53 is active. Only 52A receives it when proportioning valve 56 is active. Thus the effect of two slightly different large volumes (300 and 365 cu. in.) is had in far less space than separate 300 and 365 cu. in. volumes would require.

The structure illustrated had been designed to take advantage of manufacturing economies and to simplify maintenance. Valve units are removable, as indicated, to permit ready replacement. Economies in space and weight have been availed of.

The disclosure has been chosen to include such advantages, and this has led to a notably definite illustration and description. However extensive modifications are possible without departing from the invention, and the described embodiment is exemplary. No necessary limitation to it is implied.

We claim:

1. Control means having at least three settings for proportioning brake-applying forces in relation to loads and adapted for interposition between a brake-controlling valve device of the automatic type and a brake cylinder, said control means comprising means defining at least three flow paths between the brake cylinder connection of the brake controlling valve device and the brake cylinder, said paths being hereinafter called the first path, the second path and the third path; a selector valve device having positions in which it opens a selected one of said flow paths and closes the others against flow to the brake cylinder, the first of said paths, when open, affording substantially free flow; a first proportioning valve interposed in the second path and including flow intercepting means responsive to pressure drop of air flowing through itself to limit pressures developed in the brake cylinder to a fraction of pressures at said brake cylinder connection; a second proportioning valve interposed in the third path and including flow intercepting means responsive to pressure drop of air flowing through itself to limit pressures developed in the brake cylinder to smaller fractions of the pressures at said brake cylinder connection, as compared with the fractions characteristic of the first proportioning valve; means enclosing a volume connected with said second and third flow paths for augmenting the quantity of air drawn from said brake cylinder connection under low load and intermediate load conditions; and at least one check valve interposed between the volume and a proportioning valve to prevent cross flow through said volume.

2. Control means having at least three settings for proportioning brake-applying forces in relation to loads and adapted for interposition between a brake-controlling valve device of the automatic type and a brake cylinder, said control means comprising, means defining at least three flow paths between the brake cylinder connection of the brake-controlling valve device and the brake cylinder, said paths being hereinafter called the first path, the second path and the third path; a selector valve device having positions in which it opens a selected one of said flow paths and closes the others against flow to the brake cylinder, the first of said paths, when open, affording substantially free flow; a first proportioning valve interposed in the second path and including flow intercepting means responsive to pressure drop of air flowing through itself to limit pressures developed in the brake cylinder to a fraction of pressures at said brake cylinder connection; a second proportioning valve interposed in the third path and including flow intercepting means responsive to pressure drop of air flowing through itself to limit pressures developed in the brake cylinder to smaller fractions of the pressures at said brake cylinder connection, as compared with the fractions characteristic of the first proportioning valve; delay means associated with each proportioning valve and serving to inhibit the intercepting action of the valve until sufficient pressure has been developed on its exit side to assure initial motion of said brake piston; means enclosing a volume connected with said second and third flow paths for augmenting the quantity of air drawn from said brake cylinder connection under low load and intermediate load conditions; and at least one check valve interposed between the volume and a proportioning valve to prevent cross flow through said volume.

3. Control means having at least three settings for proportioning brake-applying forces in relation to loads and adapted for interposition between a brake-controlling valve device of the automatic type and a brake cylinder, said control means comprising, means defining at least three flow paths between the brake cylinder connection of the brake controlling valve device and the brake cylinder, said paths being hereinafter called the first path, the second path and the third path; a selector valve device having positions in which it opens a selected one of said flow paths and closes the others against flow to the brake cylinder, the first of said paths, when open, affording substantially free flow; a first proportioning valve interposed in the second path and including flow intercepting means responsive to pressure drop of air flowing through itself to limit pressures developed in the brake cylinder to a fraction of pressures at said brake cylinder connection; a second proportioning valve interposed in the third path and including flow intercepting means responsive to pressure drop of air flowing through itself to limit pressures developed in the brake cylinder to smaller fractions of the pressures at said brake cylinder connection, as compared with the fractions characteristic of the first proportioning valve; means enclosing a volume connected with said second and third flow paths for augmenting the quantity of air drawn from said brake cylinder connection under low load and intermediate load conditions; at least one check valve interposed between the volume and a proportioning valve to prevent cross flow through said volume; and means having a check valve characteristic for allowing flow from the brake cylinder toward the brake cylinder connection at least at those times when the selector valve serves to open the second or the third path.

4. The combination defined in claim 3 in which the enclosed volume is divided into two unequal enclosed spaces and two check valves are related thereto, one of which permits one-way flow from the smaller space to the larger and flow to the inlet of one proportioning valve and the other of which permits one-way flow from the inlet of the other proportioning valve to the larger of said spaces.

5. Control means having at least three settings for proportioning brake-applying forces in relation to loads and adapted for interposition between a brake-controlling valve device of the automatic type and a brake cylinder, said control means comprising, means defining at least three flow paths between the brake cylinder connection of the brake-controlling valve device and the brake cylinder, said paths being hereinafter called the first path, the second path and the third path; a selector valve device having positions in which it opens a selected one of said flow paths and closes the others against flow to the brake cylinder, the first of said paths, when open, affording substantially free flow; a first proportioning valve interposed in the second path and including flow intercepting means responsive to pressure drop of air flowing through itself to limit pressures developed in the brake cylinder to a fraction of pressures at said brake cylinder connection; a second proportioning valve interposed in the third path and including flow intercepting means responsive to pressure drop of air flowing through itself to limit pressures developed in the brake cylinder to smaller fractions of the pressures at said brake cylinder connection, as compared with the fractions characteristic of the first proportioning valve; delay means associated with each proportioning valve and serving to inhibit the intercepting action of the valve until sufficient pressure has been developed on its exit side to assure initial motion of said brake piston; means enclosing a volume connected with said second and third flow paths for augmenting the quantity of air drawn from said brake cylinder connection under low load and intermediate load conditions; at least one check valve interposed between the volume and a proportioning valve to prevent cross flow through said volume; and means having a check valve characteristic for allowing flow from the brake cylinder toward the brake cylinder connection at least at those times when the selector valve serves to open the second or the third flow path.

6. The combination defined in claim 5 in which the enclosed volume is divided into two unequal enclosed spaces, and two check valves are related thereto, one of which permits one way flow from the smaller space to the larger and flow to the inlet of one proportioning valve and the other of which permits one-way flow from the inlet of the other proportioning valve to the larger of said spaces.

References Cited in the file of this patent

UNITED STATES PATENTS

| | | |
|---|---|---|
| 831,040 | Custer | Sept. 18, 1906 |
| 1,091,596 | Snyder | Mar. 31, 1914 |
| 2,690,932 | Thomas | Oct. 5, 1954 |